US005973768A

United States Patent [19]

Mazion et al.

[11] Patent Number: 5,973,768

[45] Date of Patent: *Oct. 26, 1999

[54] LIGHT-TIGHT BAG HAVING A TRAPPED AIR EXIT

[75] Inventors: Leigh Allen Mazion, Roseville, Minn.; Gregory Kent Elliot Hall; Daniel Leo Brothers, Jr., both of Rochester, N.Y.; Shawn Lee Allen, Lino Lakes, Minn.

[73] Assignee: Imation Corp., Oakdale, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/676,862

[22] Filed: Jul. 3, 1996

[51] Int. Cl.[6] .......... G03B 27/58

[52] U.S. Cl. .......... 355/72; 396/517; 383/100

[58] Field of Search .......... 355/72; 206/455; 383/100, 103, 113; 396/517, 518, 527

[56] References Cited

U.S. PATENT DOCUMENTS

| | | | |
|---|---|---|---|
| 3,291,984 | 12/1966 | Wasser . | |
| 3,644,036 | 2/1972 | Canfield | 355/72 X |
| 3,934,150 | 1/1976 | Matsumoto et al. | 250/468 |
| 4,042,396 | 8/1977 | Sylvester | 96/76 |
| 4,057,949 | 11/1977 | Greffe . | |
| 4,413,734 | 11/1983 | Newcombe, Jr. | 206/455 |
| 4,537,307 | 8/1985 | Tamura | 206/455 |
| 4,688,915 | 8/1987 | Nicholson | 354/326 X |
| 4,809,313 | 2/1989 | Gandolfo | 378/182 |
| 4,834,554 | 5/1989 | Seteler, Jr. et al. | 383/100 |
| 4,860,042 | 8/1989 | Tajima et al. | 354/277 |
| 4,985,335 | 1/1991 | Omote | 430/209 |
| 4,993,698 | 2/1991 | Buelens et al. | 271/145 |
| 5,005,869 | 4/1991 | DiPietro | 354/276 |
| 5,008,694 | 4/1991 | Tajima et al. | 354/277 |
| 5,197,090 | 3/1993 | DiPietro et al. | 378/174 |
| 5,199,569 | 4/1993 | DiPietro et al. | 206/455 |
| 5,701,996 | 12/1997 | Goto et al. | 383/100 X |
| 5,829,884 | 11/1998 | Yeager | 383/103 X |
| 5,881,323 | 3/1999 | Mizuno et al. | 396/527 X |

FOREIGN PATENT DOCUMENTS

| | | | |
|---|---|---|---|
| 0523841 | 1/1993 | European Pat. Off. | 206/455 |
| 0 683 105 | 11/1995 | European Pat. Off. . | |
| 2224356 | 10/1974 | France . | |
| 1-251031 | 10/1989 | Japan | 206/455 |
| 3-83054 | 4/1991 | Japan | 206/455 |
| 2161621 | 1/1986 | United Kingdom | 355/72 |
| 2 237 553 | 8/1991 | United Kingdom . | |

*Primary Examiner*—Matthew S. Smith
*Attorney, Agent, or Firm*—William D. Bauer

[57] ABSTRACT

A bag and a method of packing a bag for storing sheets of material, such as photosensitive materials, provides a light-tight environment for the photosensitive material. The bag has a rear end which has a serpentine passageway, thereby creating a light-tight end as well as allowing for entrapped air to exit the cavity of the bag.

7 Claims, 3 Drawing Sheets

LIGHT-TIGHT BAG HAVING A TRAPPED AIR EXIT

FIELD OF THE INVENTION

The present invention is directed generally to a light-tight bag for use with photosensitive material. In particular, the present invention is directed to a light-tight bag in which photosensitive sheets are stored and has one end having a serpentine passageway thereby creating a light-tight seal as well as allowing trapped air to exit.

BACKGROUND OF THE INVENTION

Professional imaging systems, such as those employed for medical diagnostic (radiological) applications, having historically captured and recorded images on relatively large sized sheets of photosensitive material, using large volume wet development equipment. With the recent enactment and more rigid enforcement of environmental regulations that require safeguards against exposure to and proper disposal of chemicals used in image development equipment, image processing providers have begun the replacement of these cumbersome and expensive wet-development systems with dry silver processes. For example, in a typical dry silver imaging application for medical diagnostic applications, such as a sonogram or X-ray, the image of interest may be electro-optically captured on a 20.3 cm×25.4 cm (8"×10") sheet of dry silver photosensitive medium, so that the image size is large enough to be viewed and analyzed, is readily physically accommodated within the patient's file, and may be easily handled and stored by medical personnel without exposure to wet chemicals.

In the course of operation of a dry silver process-based imaging system, just as in the use of relatively small hand-held cameras, it is necessary to store the individual frames of the photosensitive media in a light-tight housing, while affording ready access to the frames as they are needed by the imaging equipment. In hand-held cameras, the film packaging is relatively compact, with the film being configured as either a continuous multi-frame roll housed in a light-tight cylindrical canister, or as individual sheets that may be housed in an auto-feed sealed cartridge that is disposable after all of the film sheets have been used. Unfortunately, due to their configuration and small size, neither of these hand-held camera film storage and feed approaches is capable of storing larger sheets of photosensitive material and interfacing such media with the sheet or web advance mechanisms employed by the larger, diagnostic imaging equipment.

Light-tight, single-use containers or packages for larger photosensitive materials used in, for example, medical diagnostic applications are generally known. As shown in U.S. Pat. No. 4,860,042, these light-tight containers can include a film bag or a tray covered by a lid. Also shown are carriages, or holders, which mate with the main body of a film loading device and removes the cover or the film bag while maintaining light-tightness.

In addition, there is disclosed in co-pending U.S. patent application Ser. No. 08/344,462 filed Nov. 23, 1994, entitled "Imaging Unit Container Having Shiftable Walls" a bag for storing the photosensitive sheets. The bag is sealed on three sides and has an opening through which the photosensitive sheets are placed into the bag. The open end of the bag is then rolled up and taped to the bag, thereby creating a light-tight enclosure. The bag also includes a tabbed end. However, in the process of rolling the open end to make light-tight seal, air may become entrapped within the cavity of the bag. The bag may then become bulky and later handling and shipping of the bag becomes more difficult. In a non-related field, there are bags for bulk material which include seals that are discontinuous. An example of this is shown in French patent 2,234,356. The discontinuous seal is useful in allowing air to escape from the bag so that the bags may be more easily stacked. However, this is for use in a non-analogous field as there are no provisions for providing a light-tight seal which is necessary for photosensitive materials.

The present invention addresses the drawbacks of the prior art devices and provides for a light-tight bag having a serpentine passageway at one end, thereby creating a light-tight end and also allowing for entrapped air to exit the bag.

SUMMARY OF THE INVENTION

An embodiment of the present invention includes a light-tight bag for use with photosensitive materials. At least one member is configured to form an enclosure. The enclosure defines a cavity for receiving the photosensitive material. The enclosure has light-tight sides, an open first end and a second end. The first end provides an entrance to insert the photosensitive material into the cavity. The open end is adapted and configured to be closed in a light-tight manner after insertion of the photosensitive material. The second end has a serpentine passageway, thereby creating a light-tight second end and also allowing for entrapped air to exit the cavity.

Another embodiment includes a photosensitive material and bag. The combination includes a plurality of sheets of photosensitive material. At least one member is configured to form an enclosure. The enclosure defines a cavity for receiving the sheets of the photosensitive material. The enclosure has light-tight sides, an open first end and a second end. The first end provides an entrance to insert the sheets of photosensitive material into the cavity. The open end is adapted and configured to be closed in a light-tight manner after insertion of the photosensitive material. The second end has a serpentine passageway, thereby creating a light-tight second end and also for allowing for entrapped air to exit the cavity.

In another embodiment, the invention is a method of packing photosensitive material into a bag. The bag has an enclosure defining a cavity. The enclosure has light-tight sides, open first end and a second end having a light-tight serpentine passageway. The method includes placing a plurality of sheets of photosensitive material in the cavity. Then, closing the open first end in a light-tight manner and compressing the enclosure, whereby entrapped air exits the cavity through the serpentine passageway, thereby providing a more suitable bag for shipping and handling.

Another embodiment includes a light-tight bag for use with photosensitive materials. A second member is operatively connected to the first member to form an enclosure defining a cavity for receiving photosensitive material. The first and second members each have first and second sides, front end, back end, and middle section. A back seal is spaced inward from the back end. The back seal limits the cavity's size for receiving the photosensitive material. The back seal is discontinuous thereby forming an opening into the cavity. The back seal also forms a tab. First and second side seals form a light-tight seal between the first sides and the second sides respectively. The first and second members and sized to permit the members to be rolled back and adhered to the middle section to maintain a light-tight seal. The tab has a serpentine passageway, thereby creating a light-tight seal with the back seal and the serpentine passageway allowing the entrapped air to escape.

DETAILED DESCRIPTION OF THE PREFERRED EMBODIMENTS

Figure 1:
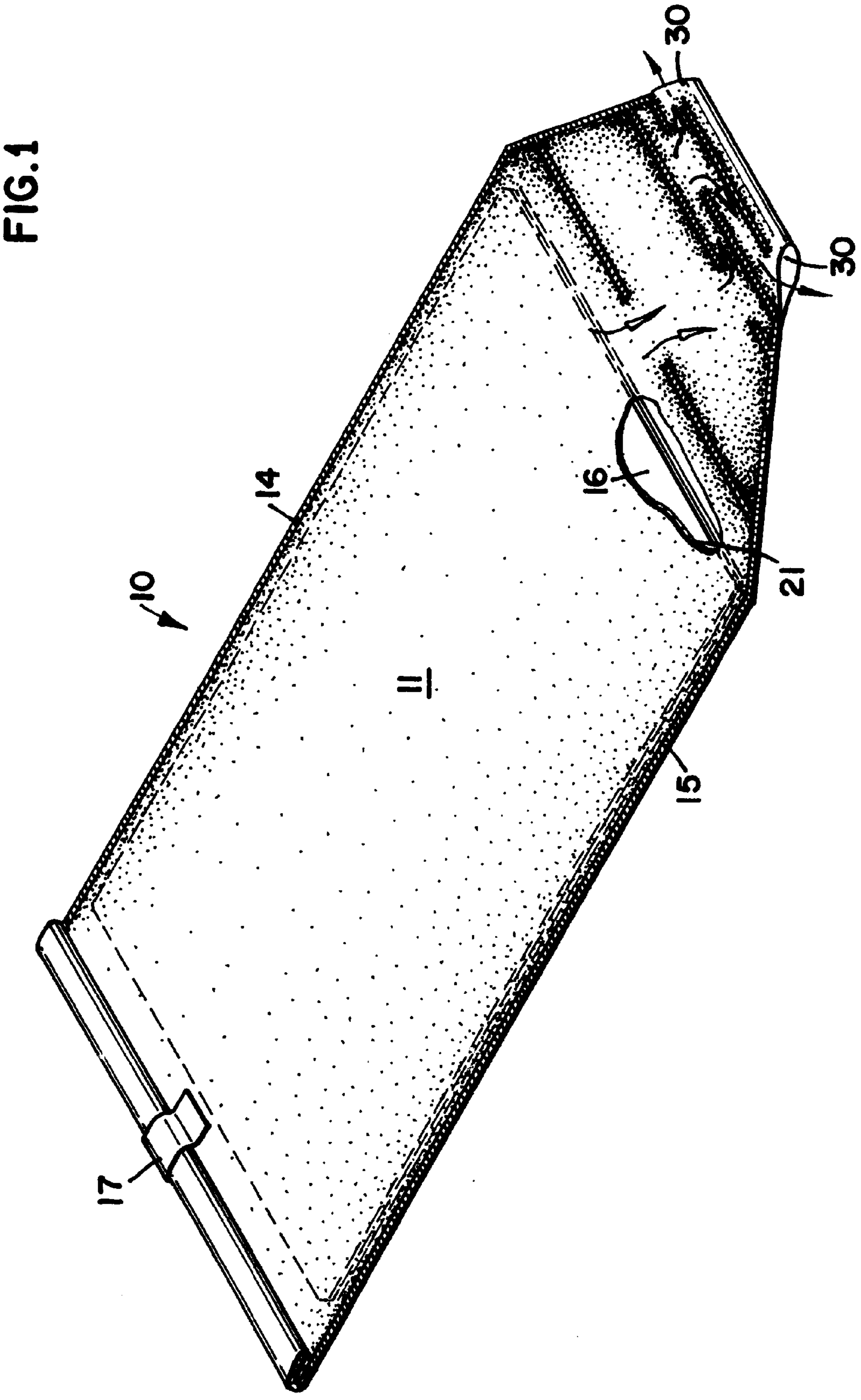
FIG. 1 is a perspective view of one embodiment of a light-tight bag of the present invention.
Figure 2:
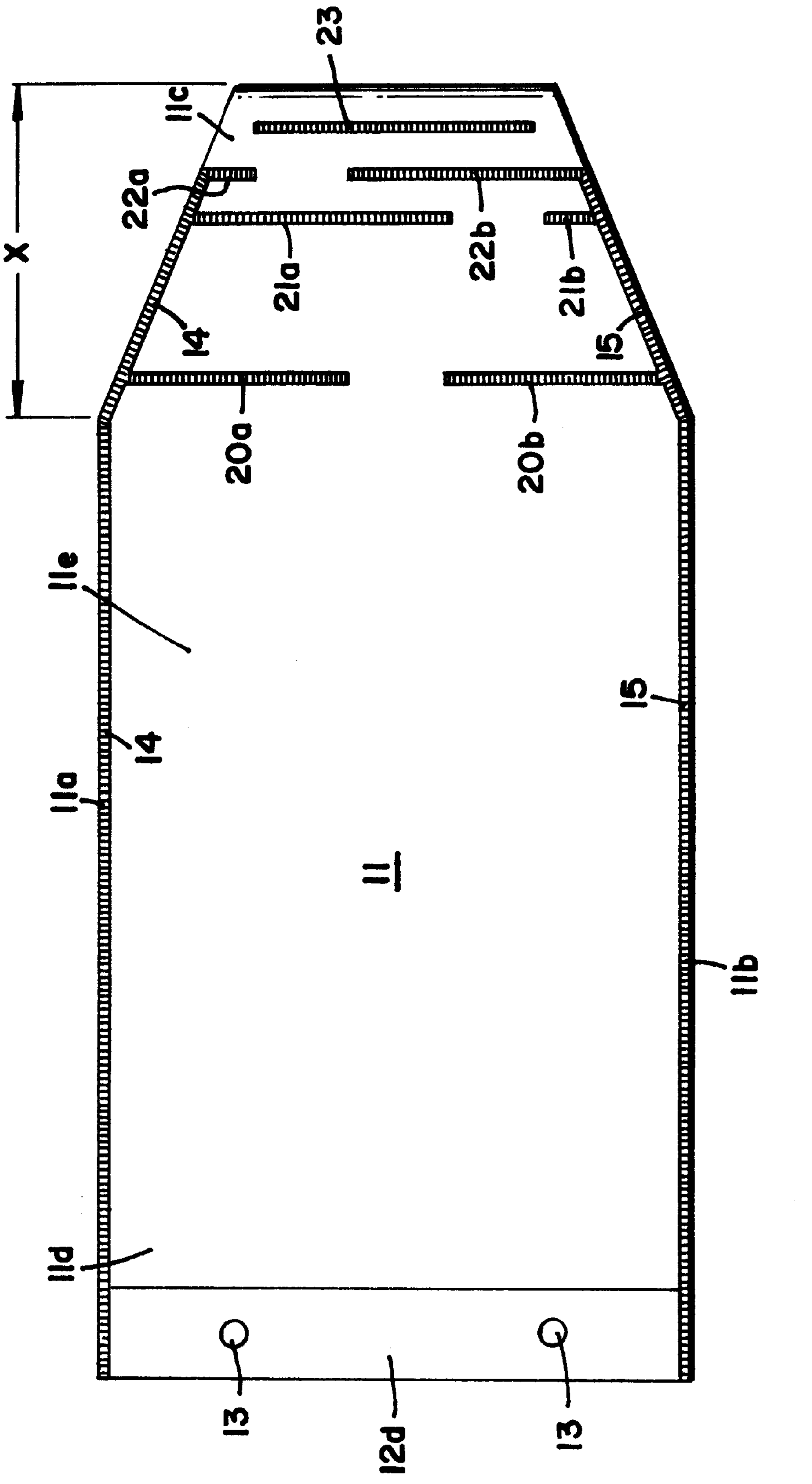
FIG. 2 is a top plan view of the bag shown in FIG. 1, in an unfolded condition.
Figure 3:
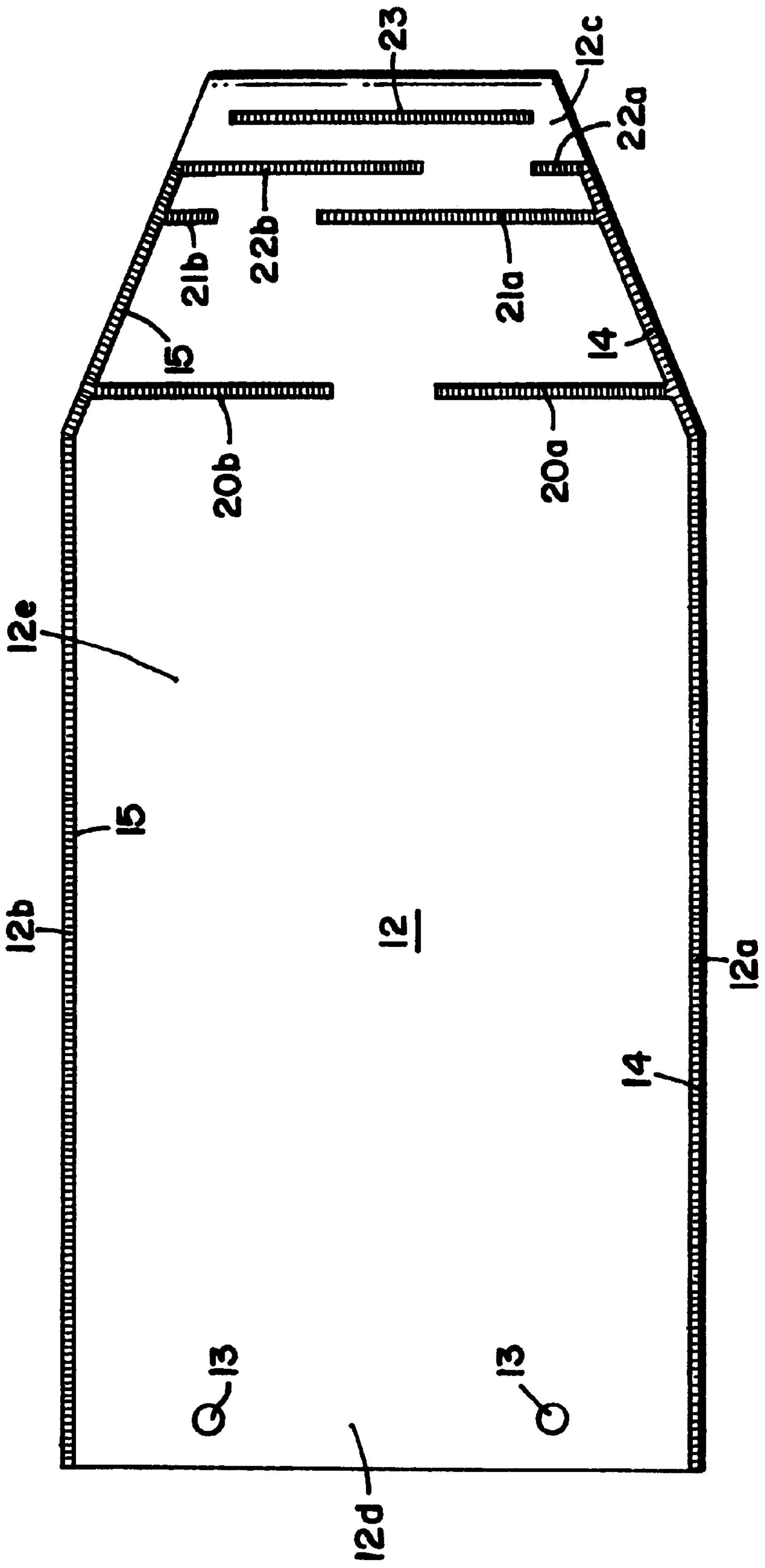
FIG. 3 is a bottom plan view of the bag shown in FIG. 2.

Referring to the drawing, wherein like numerals represent like parts throughout the several views, there is generally disclosed at 10 a light-tight bag. The light-tight bag is for storing multiple sheets of photosensitive material. The photosensitive material includes both photosensitive films and papers. The bag 10 is used with an imaging unit of the type shown in U.S. Ser. No. 08/344,462, filed Nov. 23, 1994, entitled "Imaging Unit Container Having Shiftable Walls", which is hereby incorporate by reference.

The bag 10 includes first or top member 11 and a second or bottom member 12. The members 11 and 12 may be individual sheets which are sealed together or preferably, are a single sheet that is folded and then subsequently sealed. The latter embodiment will be described in detail. The bag 10 surrounds a carrier insert (not shown), such as a rectangular fiber board tray or plastic tray, on which the film rests. The single sheet of material is folded approximately in the middle, thereby forming the top member 11 and bottom member 12. The top member 11 has a first side 11*a*, a second side 11*b*, a back end 11*c*, a front end 11*d*, and a middle section 11*e*. Similarly, the bottom member 12 has a first side 12*a*, second side 12*b*, back end 12*c*, front end 12*d*, and middle section 12*e*. The bottom member 12 is longer than the top member 11, thereby the bag 10 has an area proximate the front end 12*d* which is a single thickness. In the front end 12*d* are formed two holes 13 which are used for the handling of the bag during loading of the photosensitive material.

The members 11 and 12 are preferably a thermoplastic and more preferably a low density polyethylene with ampacet photoblack additive that has a thickness of approximately 0.006 inches. The material is preferably opaque black and has a density of between 0.91 to 0.925 grams per cubic centimeter. If the bag is made of a thermoplastic material, it may be sealed thermally. The first sides 11*a* and 12*a* are sealed by seal 14. The second sides 11*b* and 12*b* are sealed by seal 15. The seals 14 and 15 extend all the way from the back end to the front end. However, at the front end there is a portion which is not sealed as will be described more fully hereafter. The front end of the bag 10 is not sealed, but is rolled back and adhered to the middle section 11*c* of the bag 10 to maintain the light-tight enclosure for the sheets 16. The front ends 11*d* and 12*d* may be adhered with a piece of perforated tape 17 which is broken by a user just prior to inserting the bag 10 into a carriage and an imaging unit. Although the tape 17 no longer holds the bag closed, the bag 10 remains folded and light-tight due to the set the bag 10 has taken in the folded position. A back seal is spaced inward from the back end, thereby forming a tab. As shown in the figures, the tab area is wider at its front end than at its back end. The back seal comprises two seals 20*a* and 20*b*. The back seals 20*a* and 20*b* limit the size of cavity 21 for receiving the photosensitive material sheet material 16. The opening between the seals 20*a* and 20*b* provides for an entrance into the cavity 21. The back seals 20*a* and 20*b* are formed a short distance, approximately ¾ of an inch, from where the tab section begins to taper. If the size of the sheet 16 are 8"×10 ", the width of the bag is lightly larger and the distance between the seals 14 and 15 is approximately 8.937 inches. The distance between the discontinuous back seals 20*a* and 20*b* is approximately 1½ inches. Spaced rearward from the back seal 20*a* and 20*b* are three intermediate or auxiliary seals. The first auxiliary seal has two components 21*a* and 21*b*, with an opening of approximately 1½ inches between the two. The opening for the first auxiliary seal is approximately 1 inch from the first sides 11*a* and 12*a*. The second auxiliary seal 22*a* and 22*b* has an opening of approximately 1½ inches between the two seals and is approximately 1 inch from the second sides 11*b* and 12*b*. Further, the second auxiliary seals 22*a* and 22*b* are formed at the end of the seals 14 and 15. The rear portion of the tab section which extends beyond the second auxiliary seals 22*a* and 22*b* is not sealed and is best shown in the perspective view of FIG. 1. A third auxiliary seal 23 is spaced approximately ¾ of an inch from both the first and second sides. The tab area has a length X of approximately 5.5 inches. The third auxiliary seal 23 is approximately ¾ of an inch from the rear edge, with the second auxiliary seal being approximately ¾ of an inch from the third seal and also approximately ¾ of an inch from the first seal. The rear seal 20*a* and 20*b*, as well as the auxiliary seals 21*a*, 21*b*, 22*a*, 22*b*, and 23 are generally parallel.

The bag 10 has two holes 13 at its front end. These holes 13 are so that the bag may be easily handled during the filling operation. The holes are used to hang the bag 10 from a wicket which has two prongs which are inserted through the holes 13.

During packaging, a plurality of photosensitive material sheets 16 are placed in the cavity 21 of the bag 10. A liner (not shown) may also be inserted under the sheets 16. The sheets are inserted into the cavity through the front end of the bag between the members 11 and 12. The sheets are moved rearward until they contact the back seal 20*a* and 20*b*. As previously described, the front end is then rolled forward and secured with a piece of tape 17. The completed bag 10 is then moved to a suitable material handling device. A second bag is also filled and then placed on top of the first bag. The second bag compresses the first bag so that any air that is trapped in the cavity 16 is forced out of the cavity 16 through the front end openings 30. The movement of the air is shown by the arrows in FIG. 1. Since the openings in the front seal 20*a* and 20*b* and the openings in the auxiliary seals are staggered, a light-tight seal is formed, while still allowing a passageway for entrapped air to exit the cavity 21. By allowing the air to exit the cavity, a package is formed that is easier to handle and ship. The passageway formed by the opening in the back and auxiliary seals provides a serpentine or tortuous path. This path is light-tight while still allowing a passageway for air to exit. It is understood other configurations of openings may result in a similar function. Further, once the bag has collapsed, air does not reenter the bag as the reentry is prohibited by the serpentine path of the bag. However, the path must be sufficiently serpentine or tortuous to be light-tight and still allow enough of a passageway for air to exit the cavity 16.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A light-tight bag for use with photosensitive material, comprising:

at least one member configured to form an enclosure, the enclosure defining a cavity for receiving photosensitive material;

the enclosure having light-tight sides, an open first end and a second end, the first end providing an entrance to insert the photosensitive material into the cavity;

the open end adapted and configured to be closed in a light-tight manner after insertion of the photosensitive material; and the second end having a serpentine passageway, thereby creating a light-tight second end and also allowing for entrapped air to exit the cavity.

2. The bag of claim 1, wherein the member is a low density polyethylene.

3. The bag of claim 1, wherein the serpentine passageway comprises:

a discontinuous back seal forming a tab section, the discontinuous back seal forming an opening into the cavity;

the tab section having first and second sides and a rear portion;

the sides having light-tight seals from the back seal extending forward the rear portion and having openings proximate the rear portion; and a plurality of discontinuous intermediate seals extending from the first side to the second side, each intermediate seal having an opening, wherein the openings are staggered to provide a light-tight seal and the openings providing the passageway for entrapped air to exit the cavity.

4. A photosensitive material and bag, comprising:

a plurality of sheets of photosensitive material;

at least one member configured to form an enclosure, said enclosure defining a cavity for receiving the sheets of photosensitive material;

the enclosure having light-tight sides, an open first end and a second end, said first end providing an entrance to insert the sheets of photosensitive material into the cavity;

the open end adapted and configured to be closed in a light-tight manner after insertion of the photosensitive material; and the second end having a serpentine passageway, thereby creating a light-tight second end and also for allowing for entrapped air to exit the cavity.

5. A method of packing photosensitive material in a bag, the bag having an enclosure defining a cavity, the enclosure having light-tight sides, open first end and a second end having a light-tight serpentine passageway, the method comprising:

placing a plurality of sheets of photosensitive material in the cavity;

closing the open first end in a light tight manner; and compressing the enclosure, whereby entrapped air exits the cavity thru the serpentine passageway, thereby providing a more suitable bag for shipping and handling.

6. A light-tight bag for use with photosensitive material, comprising:

a first member and a second member operatively connected to form an enclosure defining a cavity for receiving photosensitive material;

the first and second members each having first and second sides, front end, back end, and middle section;

a back seal, spaced inward from the back ends, the back seal limiting the cavity's size for receiving the photosensitive material, the back seal being discontinuous, thereby forming an opening into the cavity, the back seal also forming a tab;

first and second side seals forming a light-tight seal between the first sides and the second sides respectively;

the first and second members sized to permit the members to be rolled back and adhered to the middle section to maintain a light-tight seal; and the tab having a serpentine passageway, thereby creating a light-tight seal with the back seal and the serpentine passageway allowing entrapped air to escape.

7. The bag of claim 6, wherein the first and second members are formed from a single piece of flexible material that is folded to form the top, first member and the bottom, second member.

* * * * *